(12) United States Patent
Matsumoto (10) Patent No.: US 12,382,171 B2
(45) Date of Patent: Aug. 5, 2025

(54) IMAGE CAPTURING APPARATUS FOR CAPTURING AND COMPOSITING IMAGES DIFFERENT IN IN-FOCUS POSITION, CONTROL METHOD, AND STORAGE MEDIUM

(71) Applicant: CANON KABUSHIKI KAISHA, Tokyo (JP)

(72) Inventor: Shogo Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 18/460,261

(22) Filed: Sep. 1, 2023

(65) Prior Publication Data

US 2024/0089597 A1 Mar. 14, 2024

(30) Foreign Application Priority Data

Sep. 6, 2022 (JP) ................................ 2022-141405

(51) Int. Cl.
*H04N 23/67* (2023.01)
*H04N 23/611* (2023.01)

(52) U.S. Cl.
CPC ......... *H04N 23/675* (2023.01); *H04N 23/611* (2023.01)

(58) Field of Classification Search
CPC .. H04N 23/675; H04N 23/611; H04N 23/676; H04N 23/667; H04N 23/6811
USPC ........................................................ 348/345
See application file for complete search history.

(56) References Cited

U.S. PATENT DOCUMENTS

| | | | | |
|---|---|---|---|---|
| 9,386,223 | B2* | 7/2016 | Matsumoto | H04N 23/698 |
| 10,249,055 | B2* | 4/2019 | Adachi | G06T 7/254 |
| 11,039,060 | B2* | 6/2021 | Kawanishi | H04N 23/675 |
| 11,375,110 | B2* | 6/2022 | Shiota | H04N 23/631 |
| 11,778,321 | B2* | 10/2023 | Yasutomi | H04N 23/63 |
| | | | | 348/231.6 |
| 2014/0009572 | A1* | 1/2014 | Matsumoto | H04N 23/743 |
| | | | | 348/36 |
| 2015/0326798 | A1* | 11/2015 | Muto | H04N 23/951 |
| | | | | 348/239 |
| 2017/0244938 | A1* | 8/2017 | Al Mohizea | H04N 23/65 |
| 2017/0316575 | A1* | 11/2017 | Adachi | G06T 5/50 |
| 2021/0195100 | A1* | 6/2021 | Shiota | H04N 23/951 |
| 2021/0314548 | A1* | 10/2021 | Wippermann | H04N 13/128 |
| 2021/0352216 | A1* | 11/2021 | Yasutomi | H04N 23/90 |

(Continued)

FOREIGN PATENT DOCUMENTS

JP 2008010970 A 1/2008

*Primary Examiner* — Pritham D Prabhakher
(74) *Attorney, Agent, or Firm* — Canon U.S.A., Inc. IP Division (57) ABSTRACT

An apparatus includes a sensor configured to capture a plurality of images different in in-focus position in an optical axis direction, and at least one processor configured to function as a control unit configured to control the sensor, a composition unit configured to generate, from the plurality of images, a composite image including an area more focused than each of the plurality of images, and a determination unit configured to determine whether a selfie is being taken. In a case where the selfie is being taken and a predetermined condition is satisfied, the control unit controls the sensor to capture the plurality of images, and the composition unit generates the composite image.

16 Claims, 8 Drawing Sheets

(56) References Cited

U.S. PATENT DOCUMENTS

2022/0011661 A1\* 1/2022 Wippermann ......... H04N 23/51
2023/0421717 A1\* 12/2023 Zhou .................... G06T 3/4007

\* cited by examiner

IMAGE CAPTURING APPARATUS FOR CAPTURING AND COMPOSITING IMAGES DIFFERENT IN IN-FOCUS POSITION, CONTROL METHOD, AND STORAGE MEDIUM

BACKGROUND

Technical Field

The aspect of the embodiments relates to an image capturing apparatus, and in particular to a technique for capturing images different in in-focus position.

Description of the Related Art

Japanese Patent Application Laid-Open No. 2008-10970 discusses a focus bracket technique of capturing a plurality of images of an object while changing an in-focus position of the object, thereby generating the plurality of images different in in-focus position.

In a case where a user (an image capturing person) himself or herself is imaged, i.e., a selfie is taken, both of the user and a background as objects may be desirably clearly imaged with less blur. However, in most cases, it is difficult to capture an image without blurs of the user and the background in one-time image capturing because the user and the background are largely away from each other in a depth direction.

SUMMARY

According to an aspect of the embodiments, an apparatus includes a sensor configured to capture a plurality of images different in in-focus position in an optical axis direction and at least one processor configured to function as a control unit configured to control the sensor, a composition unit configured to generate, from the plurality of images, a composite image including an area more focused than each of the plurality of images, and a determination unit configured to determine whether a selfie is being taken, wherein, in a case where the selfie is being taken and a predetermined condition is satisfied, the control unit controls the sensor to capture the plurality of images, and the composition unit generates the composite image.

Further features of the disclosure will become apparent from the following description of exemplary embodiments with reference to the attached drawings.

DESCRIPTION OF THE EMBODIMENTS

An exemplary embodiment of the disclosure will be described in detail below with reference to the accompanying drawings.

<Outline of Digital Camera>

Figure 1:
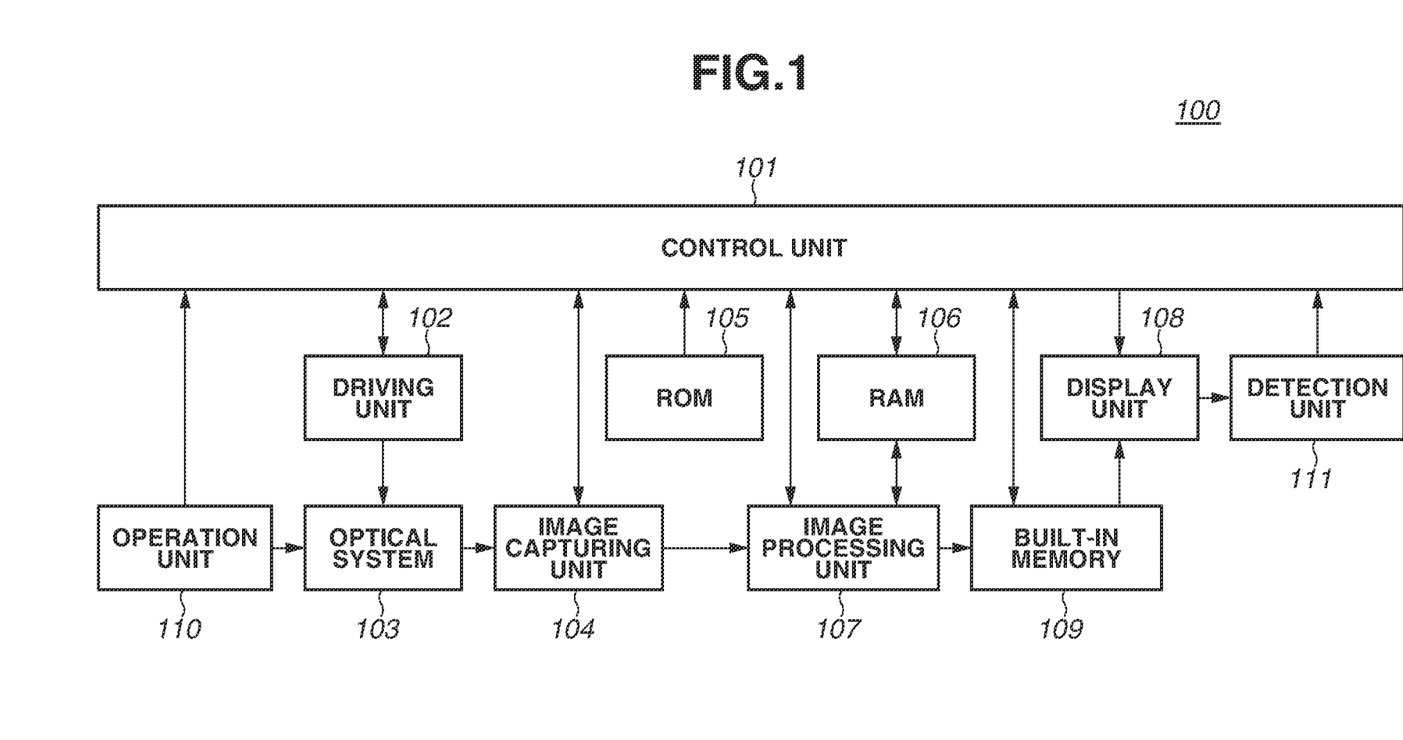
FIG. 1 is a block diagram illustrating a configuration of a digital camera according to an exemplary embodiment.

FIG. 1 is a block diagram illustrating an example of a configuration of a digital camera 100 for capturing images according to the present exemplary embodiment. The digital camera 100 can capture still images, record focal position information, calculate contrast values, composite images, and the like. The digital camera 100 can also perform enlargement processing or reduction processing on images captured and stored therein, or images input from an external apparatus.

A control unit 101 is a signal processor such as a central processing unit (CPU) or a micro processing unit (MPU), and controls components of the digital camera 100 while reading out programs prestored in a read only memory (ROM) 105 (described below). For example, as described below, the control unit 101 issues an image capturing start instruction and an image capturing end instruction to an image capturing unit 104 (described below). The control unit 101 also issues an image processing instruction to an image processing unit 107 (described below) based on the programs stored in the ROM 105. An instruction from a user is input to the digital camera 100 through an operation unit 110 (described below) and transmitted to the components of the digital camera 100 through the control unit 101.

A driving unit 102 includes a motor, and mechanically operates an optical system 103 (described below) under instructions from the control unit 101. For example, the driving unit 102 moves a position of a focus lens included in the optical system 103 based on the instructions from the control unit 101, to adjust a focal length of the optical system 103.

The optical system 103 includes a zoom lens, the focus lens, and a diaphragm. The diaphragm is a mechanism for adjusting an amount of light passing through the optical system 103. The focal position can be changed by changing positions of the lenses.

The image capturing unit 104 is a photoelectric conversion device that performs photoelectric conversion to convert an incident optical signal into an electric signal. For example, a charge-coupled device (CCD) image sensor or a complementary metal-oxide semiconductor (CMOS) image sensor can be applied to the image capturing unit 104. The image capturing unit 104 has a moving image capturing mode, and can capture a plurality of temporally consecutive images as frames of a moving image.

The ROM 105 is a nonvolatile read only memory serving as a storage medium, and stores operation programs for the blocks included in the digital camera 100, parameters for operations of the blocks, and the like. A random access memory (RAM) 106 is a volatile rewritable memory, and is used as a temporary storage area for data output by the operations of the blocks included in the digital camera 100.

The image processing unit 107 performs various types of image processing, such as white balance adjustment, color interpolation, and filtering, on an image output from the image capturing unit 104 or image signal data recorded in a built-in memory 109 (described below). The image processing unit 107 also performs compression processing on image signal data captured by the image capturing unit 104 according to, for example, a Joint Photographic Experts Group (JPEG) standard.

The image processing unit 107 includes an integrated circuit (an application specific integrated circuit (ASIC)) including circuits each performing specific processing. Alternatively, the control unit 101 may perform a part or all of the functions of the image processing unit 107 by performing processing based on the programs read out from the ROM 105. In a case where the control unit 101 performs all of the functions of the image processing unit 107, it is unnecessary to include the image processing unit 107 as hardware.

A display unit 108 is, for example, a liquid crystal display or an organic electroluminescence (EL) display and is used to display an image temporarily stored in the RAM 106, an image stored in the built-in memory 109 (described below), a setting screen of the digital camera 100, and the like. The display may be of a movable type such as a variable angle type or a tilt type.

The built-in memory 109 is an area where the images captured by the image capturing unit 104, the images subjected to the processing by the image processing unit 107, focal position information in image capturing, and the like are recorded. In place of the built-in memory 109, a memory card or the like may be used.

The operation unit 110 includes, for example, buttons, switches, keys, and a mode dial provided on the digital camera 100, or a touch panel also serving as the display unit 108. The instruction from the user is transmitted to the control unit 101 through the operation unit 110.

A detection unit 111 can detect the direction and position of a surface of the display unit 108 where image data is displayed in a case where the display unit 108 is a movable display of a variable angle type or a tilt type. The detection unit 111 can also detect the movement or shake of the digital camera 100 when the digital camera 100 is held by hand.

<Object Image Formation>

Object image formation will be briefly described next.

FIGS. 2A to 2D are diagrams illustrating a state where an object image is formed on an image forming plane according to the present exemplary embodiment.

Figure 2A:
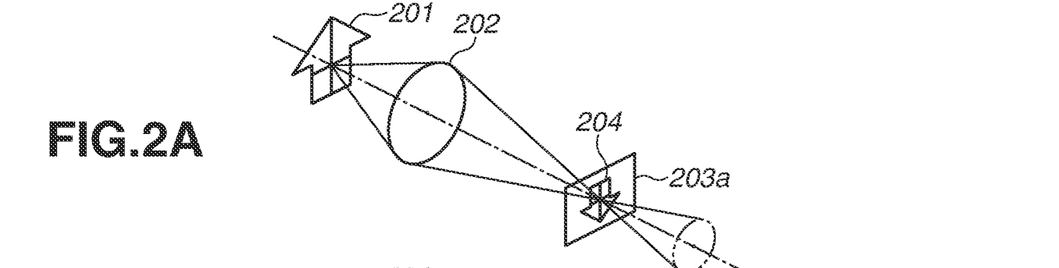
FIGS. 2A to 2D are diagrams illustrating a state where an object image is formed on an image forming plane according to the exemplary embodiment.

FIG. 2A illustrates a state where an image 204 of an object 201 is formed on a plane 203a by an optical lens 202. In other words, when the plane 203a and an image sensor plane of the image capturing unit 104 are coincident with each other, the image 204 of the object 201 is formed as a "point" on the image sensor plane (the plane 203a), and is recorded as a focused image.

Figure 2B:
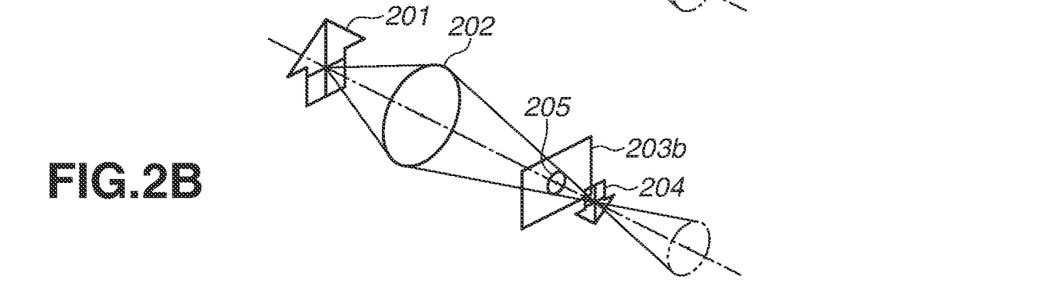

FIG. 2B illustrates a state where the image forming plane and the image sensor plane are not coincident with each other. In a case where an image sensor plane 203b is present at a position different from the position of the plane 203a illustrated in FIG. 2A, the image 204 of the object 201 formed by the optical lens 202 appears as a circle of confusion 205 on the image sensor plane 203b. In the situation illustrated in FIG. 2B, in a case where the circle of confusion 205 is smaller than a permissible circle of confusion of the image sensor, the circle of confusion 205 can be regarded as being equivalent to the "point" in the focusing state, and an image equivalent to the focused image is obtained. In contrast, in a case where the circle of confusion 205 is larger than the permissible circle of confusion, a blurred image is obtained on the image sensor plane 203b.

Figure 2C:
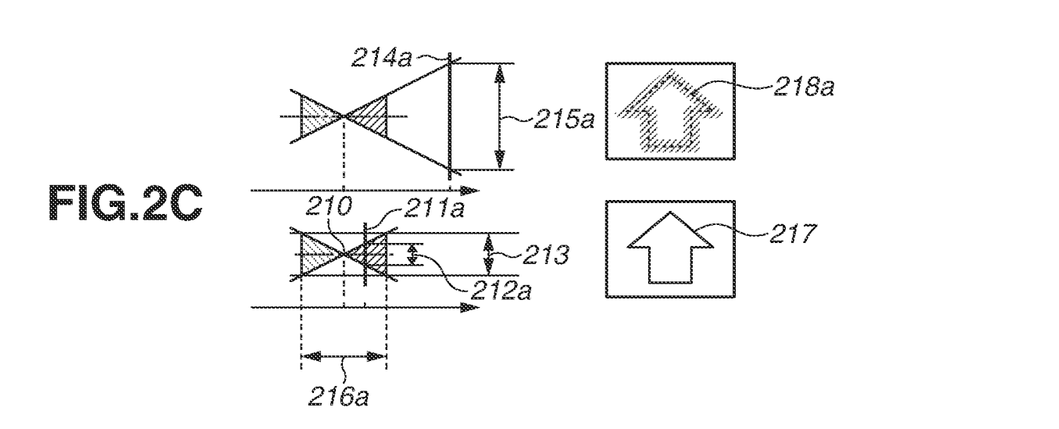

FIG. 2C is a diagram illustrating the above-described situation as viewed from a side. In a case where the image 204 of the object 201 is formed on a focal point 210, and the image sensor plane is present at a position of a plane 211a, a circle-of-confusion diameter 212a is obtained. The circle-of-confusion diameter 212a illustrated in FIG. 2C is smaller than a permissible circle-of-confusion diameter 213 of the image sensor. Thus, an image 217 recorded by the image sensor is a focused image without blur.

On the other hand, in a case where the image sensor plane is present at a position of a plane 214a, a circle-of-confusion diameter 215a at this time is larger than the permissible circle-of-confusion diameter 213. Thus, an image 218a on the image sensor plane (the plane 214a) is a blurred image. A hatched area where the circle-of confusion diameter 212a is smaller than the permissible circle-of-confusion diameter 213 indicates a depth of focus 216a, and a depth of field is obtained by converting and replacing the depth of focus 216a on the object side.

Figure 2D:
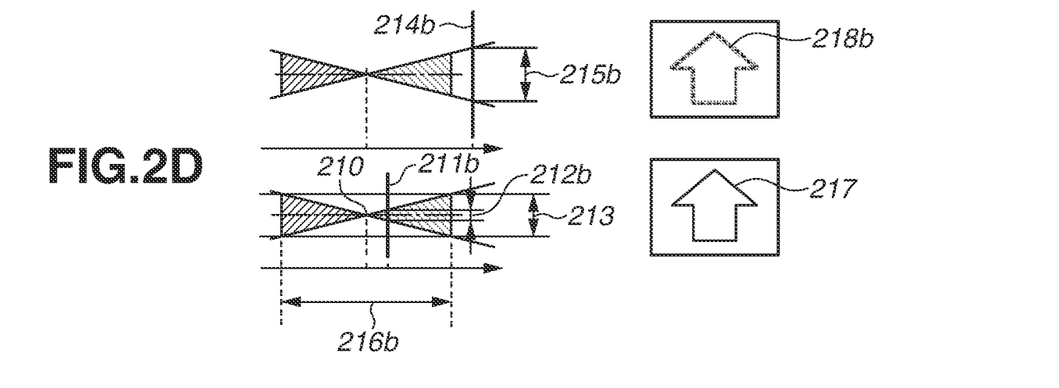

FIG. 2D is a diagram illustrating a state where the aperture is closed as compared with the state in FIG. 2C. In the state where the aperture is closed, the circle-of-confusion diameters 212a and 215a are respectively changed to a circle-of-confusion diameter 212b for a plane 211b and a circle-of-confusion diameter 215b for a plane 214b because a difference in incident light diameter causes a difference in depth. As compared with the circle-of-confusion diameter 215a in FIG. 2C, the circle-of-confusion diameter 215b in FIG. 2D is small. Thus, an image 218b illustrated in FIG. 2D has less blur than the image 218a. A depth of focus 216b illustrated in FIG. 2D is deeper than the depth of focus 216a.

<Focus Stacking>

Examples of application of focus bracket include focus stacking.

Figure 3:
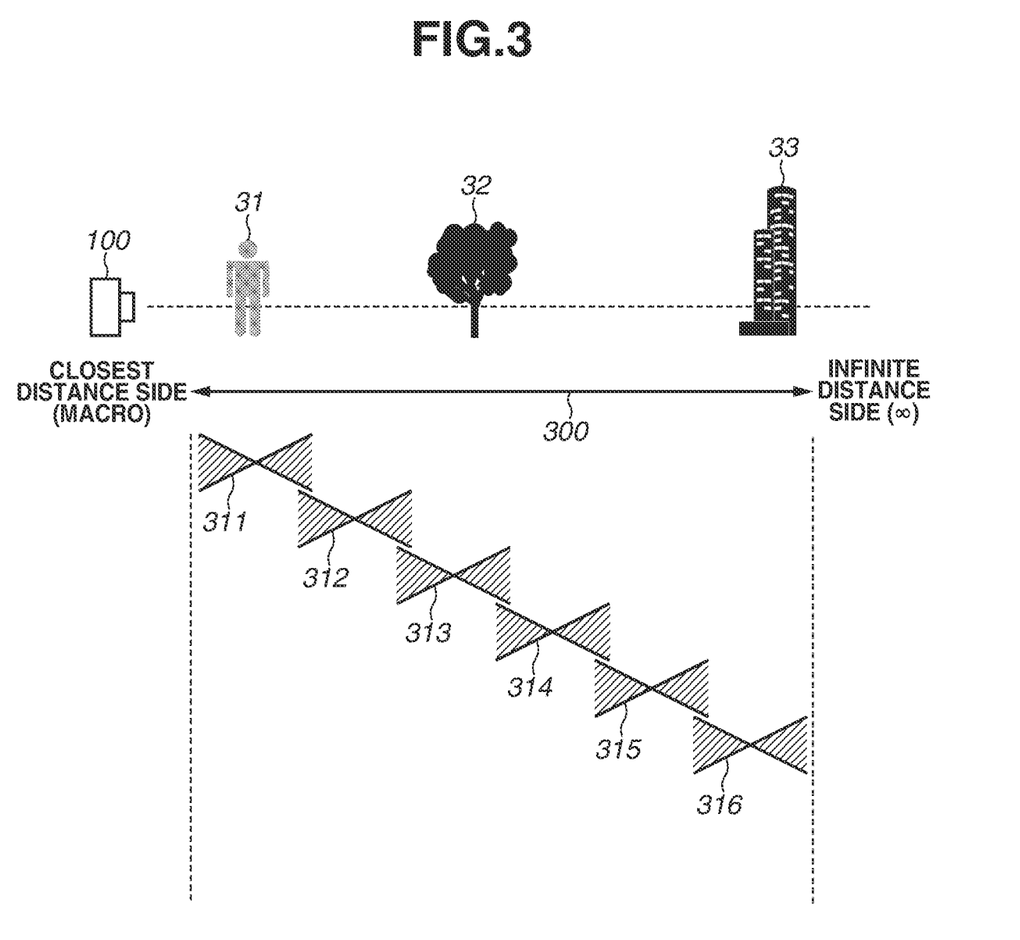
FIG. 3 is a diagram illustrating a relationship between an in-focus position and an image magnification according to the exemplary embodiment.

FIG. 3 is a diagram illustrating focus stacking imaging according to the present exemplary embodiment. As objects to be focused, objects 31 to 33 are assumed. The objects 31 to 33 are present at distances (object distances) different from one another, and the objects 31, 32, and 33 are positioned in this order from the side closer to the digital camera 100 (in the direction from the close distance side toward the long distance side). To obtain a focus stacking image in which all of the plurality of objects 31 to 33 are in focus, a focal range 300 (a bracket range) where focus bracket imaging is performed is to be covered with a plurality of depths of focus. Depths of field 311 to 316 indicate depths of focus in respective image capturing operations, and are arranged to cover the focal range 300. In other words, when image capturing is performed (six times) at in-focus positions where the depths of field 311 to 316 are obtainable, the objects 31 to 33 within the focal range 300 are in focus in any of captured images. Further, among the plurality of images captured in such a manner, images of areas within the depths of focus in the respective image capturing operations are composited. As a result, an image where the entire focal range 300 (the entire bracket range) is in focus can be obtained.

The focus stacking technique is useful to obtain an image with high resolution feeling. When the depth of field in capturing each image is made shallow in the focus bracket imaging, an image area with extremely high resolution feeling is obtained in a focused area. When composition is performed on the focused areas, high resolution feeling can be maintained even with the composite image.

<Configuration of Image Capturing Unit>

Figure 4A:
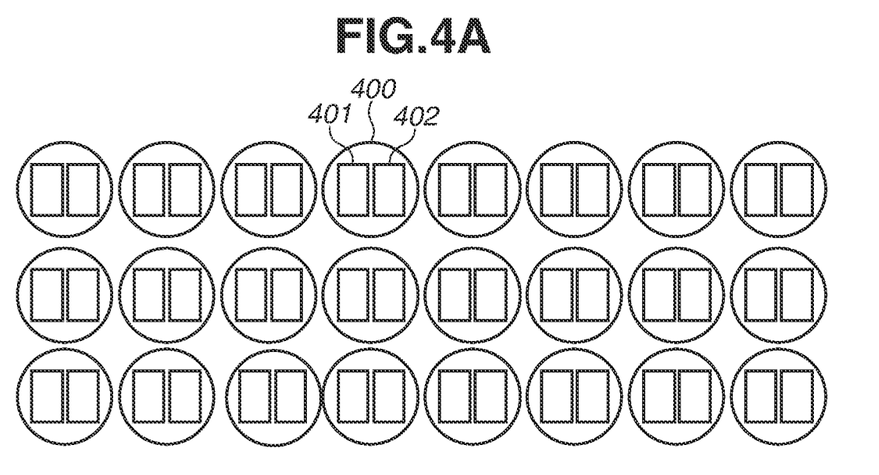
FIGS. 4A to 4C are diagrams illustrating focus stacking imaging according to the exemplary embodiment.
Figure 4B:
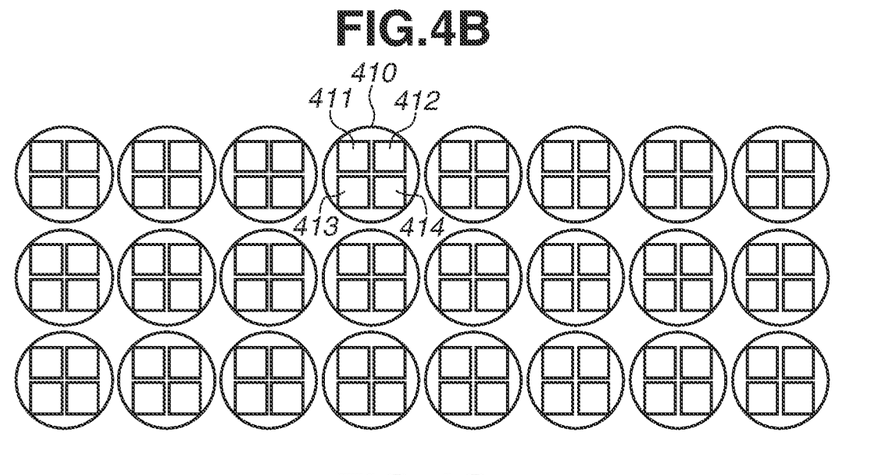
Figure 4C:
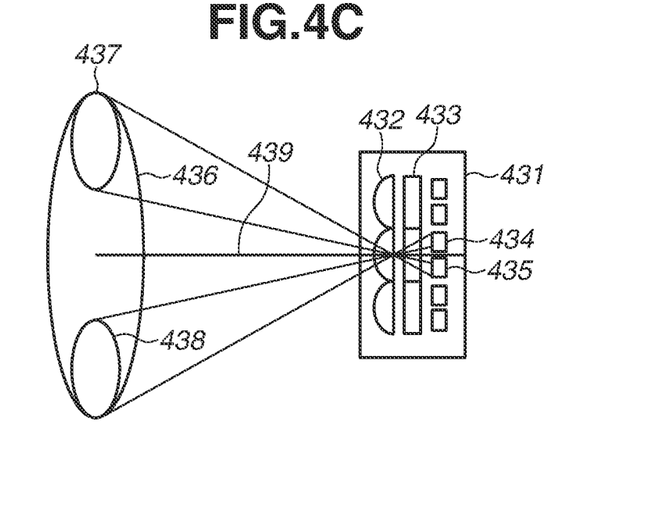

FIGS. 4A to 4C are diagrams illustrating the image sensor provided in the image capturing unit 104 according to the present exemplary embodiment.

In a photoelectric conversion device illustrated in FIG. 4A, each pixel 400 includes two photoelectric conversion units 401 and 402. In a photoelectric conversion device illustrated in FIG. 4B, each pixel 410 includes four photoelectric conversion units 411 to 414. When a signal is independently read out from each of the photoelectric conversion units 401 and 402 in one pixel 400 of the device illustrated in FIG. 4A or from each of the photoelectric conversion units 411 to 414 in one pixel 410 of the device illustrated in FIG. 4B, distance information about an object can be calculated. The signal independently read out from each of the above-described photoelectric conversion units is referred to as a pupil division signal. When the pupil division signals are recoded with image signals, the control unit 101 can calculate relative positions of the areas of the image in an optical axis direction, through analysis by the image processing unit 107.

FIG. 4C illustrates incidence of an optical signal into one pixel 400 in the device illustrated in FIG. 4A. In FIG. 4C, a pixel array 431 includes a microlens 432, a color filter 433, and photoelectric conversion units 434 and 435. The photoelectric conversion units 434 and 435 belong to the same pixel 400, and correspond to the microlens 432 and the color filter 433. FIG. 4C is a diagram of the digital camera 100 as viewed from above, and indicates that the two photoelectric conversion units 434 and 435 corresponding to one pixel 400 are arranged side by side. Among light fluxes emitted from an exit pupil 436, a light flux (corresponding to a light flux from an area 437) on an upper side of an optical axis 439 enters the photoelectric conversion unit 435, and a light flux (corresponding to a light flux from an area 438) on a lower side of the optical axis 439 enters the photoelectric conversion unit 434. In other words, the photoelectric conversion units 434 and 435 receive light of different areas of the exit pupil 436 of the image capturing lens. When a signal received by the photoelectric conversion unit 434 is referred to as an image A, and a signal received by the photoelectric conversion unit 435 is referred to as an image B, the images A and B correspond to one pair of pupil division signals described above. A focus deviation amount can be calculated based on a phase difference between the image A and the image B, and the distance information can be obtained.

<Focus Stacking Procedure>

Next, a procedure for generating the focus stacking image according to the present exemplary embodiment will be described.

Figure 5:
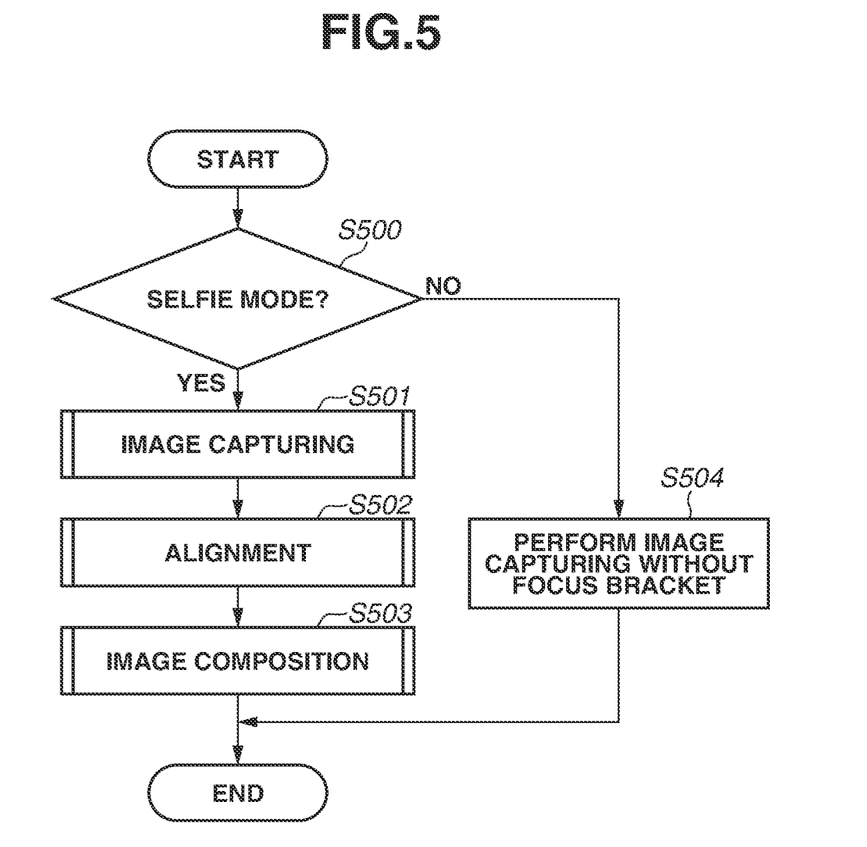
FIG. 5 is a flowchart illustrating composite image generation according to the exemplary embodiment.

FIG. 5 is a flowchart illustrating composite image generation according to the present exemplary embodiment.

In step S500, the control unit 101 determines whether the current mode is a selfie mode. A specific determination method will be described below. In a case where the current mode is the selfie mode (YES in step S500), the processing proceeds to step S501. In a case where the current mode is not the selfie mode (NO in step S500), the processing proceeds to step S504.

In step S501, the image capturing unit 104 captures a plurality of images different in in-focus position in the optical axis direction. The processing then proceeds to step S502. In step 502, the control unit 101 aligns the plurality of images captured by the image capturing unit 104 in step S501. The processing then proceeds to step S503. In step S503, the image processing unit 107 composites the aligned images to generate a composite image having a deeper depth of field.

In step S504, the image capturing unit 104 performs image capturing without focus bracket. At this time, the image capturing unit 104 may capture one image or a plurality of images.

<Selfie Mode Determination Method>

The method for determining whether the current mode is the selfie mode will be described next.

One example thereof is that information indicating the direction of the display unit 108 is acquired from the detection unit 111, and if the direction of the display unit 108 is the same as the direction of the optical system 103, the control unit 101 determines that the current mode is the selfie mode.

Alternatively, information about the face of the user (the image capturing person) himself or herself may be recorded in advance in a storage medium such as the ROM 105, the RAM 106, or the built-in memory 109, and an object of an image to be captured may be determined. In a case where the recorded face of the user is present as the object, the current mode may be determined as the selfie mode.

Further alternatively, in a case where the object closest to the digital camera 100 is a face, and a distance from the digital camera 100 to the face is calculated to be equal to a general length of a human arm based on the size of the face, the position of the digital camera 100, and the optical condition of the digital camera 100, the current mode may be determined as the selfie mode. This is because it is considered that, in the selfie mode, the object closest to the image capturing apparatus (the digital camera 100) is the face of the user himself or herself in most cases, and the distance from the image capturing apparatus (the digital camera 100) to the face of the user is equal to the length of the arm of the user.

As another image generation method, in determining whether the current mode is the selfie mode in step S500, in a case where the detection unit 111 detects the shake of the digital camera 100 and the shake amount exceeds a predetermined threshold, the current mode may be determined to be not the selfie mode. In other words, in a case where the shake amount is less than or equal to the threshold, the digital camera 100 performs the selfie mode. This is because, in the focus stacking imaging, the plurality of images is captured in a short time, and the images suitable for composition are unable to be obtained if camera shake occurs. In this case, the threshold for the shake amount is set based on a value at which an image blur that is unable to be complemented by the above-described alignment processing can occur. Also in a case where the object itself moves and the images suitable for composition are unable to be captured, the current mode may be determined to be not the selfie mode for a similar reason. In addition, in a case where the direction of the display unit 108 detected by the detection unit 111 and the direction of the optical system 103 are coincident with each other but no face is present in the image subject to the object determination or the user is not present therein, it may be considered that the object is only the background, and it may be determined that the current mode is not the selfie mode.

As described above, it is considered that, in the selfie mode, the object closest to the image capturing apparatus (the digital camera 100) is the face of the user himself or herself in most cases, and the distance from the image capturing apparatus (the digital camera 100) to the face of the user is equal to the length of the arm of the user. In other words, it is considered that the distance from the digital camera 100 to the face of the user, and the depth of the face as the object are substantially constant. Accordingly, the focus bracket imaging may be performed while the general length of a human arm, the general depth of a human face, and the in-focus positions and the number of imaging times predetermined based on the optical condition of the image capturing apparatus (the digital camera 100) are used as the focus stacking imaging settings for the face of the user that is the object closest to the digital camera 100. The background farther than the face of the user may be imaged by the digital camera 100 with settings different from those for the face. For example, for the background, the digital camera 100 may capture one image at the in-focus position corresponding to the background without capturing a plurality of images different in in-focus position.

<Method for Performing Focus Stacking>

Each of the steps in FIG. 5 will be described in detail next.

Figure 6:
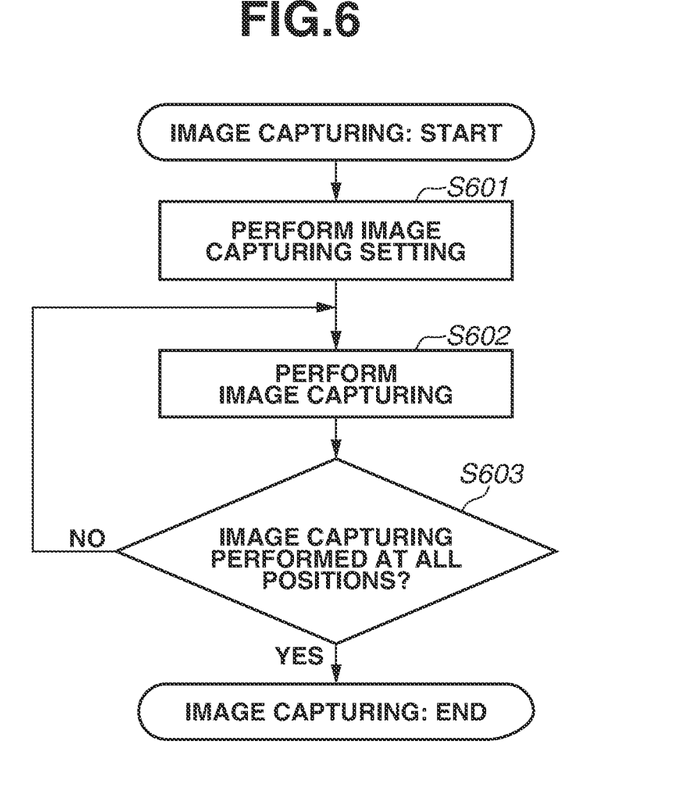
FIG. 6 is a flowchart illustrating image capturing according to the exemplary embodiment.

FIG. 6 is a flowchart illustrating the image capturing in step S501 according to the present exemplary embodiment.

In step S601, the control unit 101 performs an image capturing setting. For example, the user specifies, on the touch panel, a position to be focused, and the control unit 101 specifies a predetermined number of other in-focus positions with predetermined in-focus intervals by using the user-specified position as the in-focus position on the closest distance side. Alternatively, the control unit 101 may use the user-specified position as the in-focus position on the infinite distance side (the farthest side).

Further alternatively, the control unit 101 may specify the first in-focus position by using an automatic focusing function cooperating with the optical system 103.

Yet further alternatively, the user may specify, on the touch panel, two positions, and the control unit 101 may use the user-specified positions as the in-focus positions on the infinite distance side and the closest distance side.

In step S602, the image capturing unit 104 performs image capturing at the in-focus position earliest in image capturing order among the in-focus positions, specified in step S601, where image capturing has not yet been performed.

In step S603, the control unit 101 determines whether image capturing has been performed at all of the in-focus positions specified in step S601. In a case where the control unit 101 determines that image capturing has been performed at all of the in-focus positions (YES in step S603), the processing in the flowchart illustrated in FIG. 6 ends. In a case where there is an in-focus position where image capturing has not yet been performed (NO in step S603), the processing returns to step S602.

In the case of a multi-eye camera including a plurality of the image capturing units 104, image capturing may be performed simultaneously at the plurality of in-focus positions specified in step S601.

Figure 7:
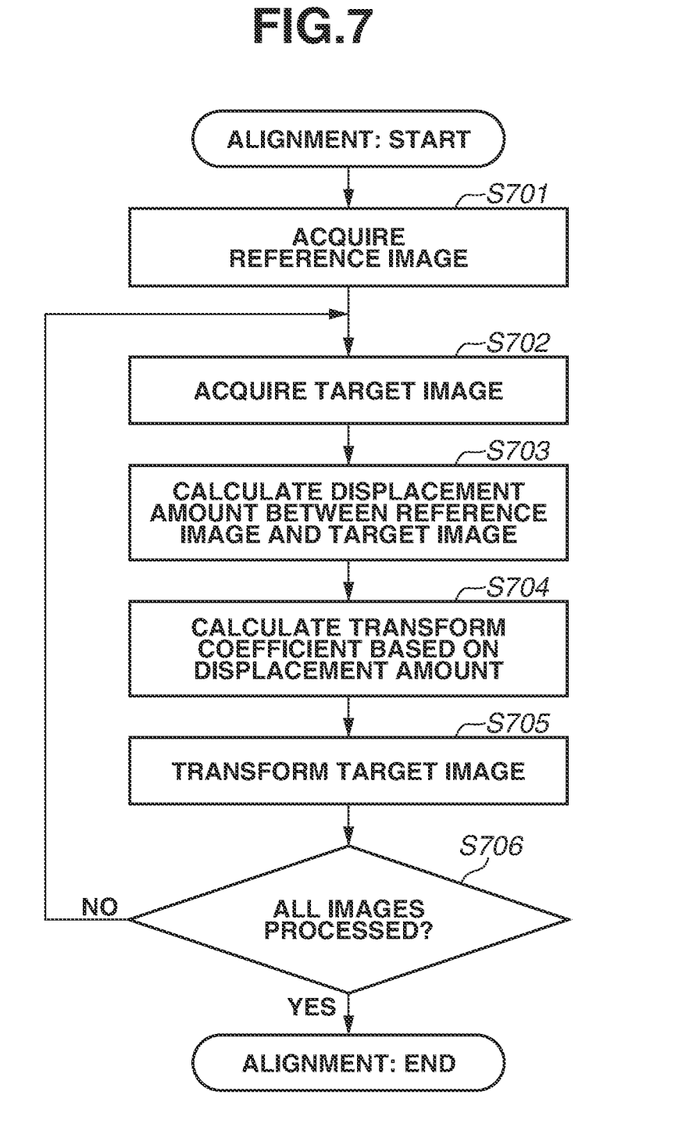
FIG. 7 is a flowchart illustrating alignment in focus stacking according to the exemplary embodiment.

FIG. 7 is a flowchart illustrating alignment in the focus stacking according to the present exemplary embodiment.

In step S701, the control unit 101 acquires an alignment reference image from the images captured by the image capturing unit 104 in step S501. The alignment reference image is, for example, the image earliest in image capturing order. Alternatively, the image having the narrowest angle of view among the captured images may be used as the alignment reference image because, when image capturing is performed while the in-focus position is changed, a slight difference in angle of view occurs among the captured images.

In step S702, the control unit 101 acquires a target image for the alignment processing. The target image is an image that has not yet been subjected to the alignment processing among the images other than the reference image acquired in step S701. In a case where the image earliest in image capturing order is used as the reference image, the control unit 101 sequentially acquires the target images in the image capturing order.

In step S703, the control unit 101 calculates a position displacement amount between the reference image and the target image. An example of the calculation method will now be described. First, the control unit 101 sets a plurality of blocks in the reference image. In one embodiment, the control unit 101 sets the blocks so that the blocks have the same size. Next, the control unit 101 sets, in the target image, search ranges at the same positions as those of the blocks in the reference image so that the search ranges are wider than the corresponding blocks. Finally, the control unit 101 calculates, in each of the search ranges of the target image, a correspondence point where a sum of absolute differences (hereinafter referred to as an SAD) of luminance between the search range and the corresponding block in the reference image is smallest. The control unit 101 calculates the position displacement amount in step S703 as a vector based on the center of the corresponding block in the reference image and the above-described correspondence point. To calculate the above-described correspondence point, the control unit 101 may use a sum of squared differences (hereinafter referred to as an SSD) or normalized cross correlation (hereinafter referred to as NCC) instead of the SAD.

In step S704, the control unit 101 calculates a transform coefficient based on the position displacement amount between the reference image and the target image. The control unit 101 uses, for example, a projective transform coefficient as the transform coefficient. However, the transform coefficient is not limited only to the projective transform coefficient, and an affine transform coefficient or a simplified transform coefficient of only horizontal and vertical shifts may also be used.

In step S705, the image processing unit 107 performs transformation on the target image by using the transform coefficient calculated in step S704.

For example, the control unit 101 can perform the transformation by using the following equation (1):

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ z \end{pmatrix} \quad (1)$$

In the equation (1), (x', y') represents a coordinate after the transformation, and (x, y) represents a coordinate before the transformation. A matrix A represents the transform coefficient calculated by the control unit 101 in step S704.

In step S706, the control unit 101 determines whether the alignment processing has been performed on all of the images other than the reference image. In a case where the alignment processing has been performed on all of the images other than the reference image (YES in step S706), the processing in the flowchart illustrated in FIG. 7 ends. In a case where there is an unprocessed image (NO in step S706), the processing returns to step S702.

In a case where the alignment processing is performed on the plurality of images captured by the above-described multi-eye camera, the alignment processing can similarly be performed because a parallax amount generated by the difference in position among the optical systems 103 can be determined using the displacement amount calculation in step S703.

Figure 8:
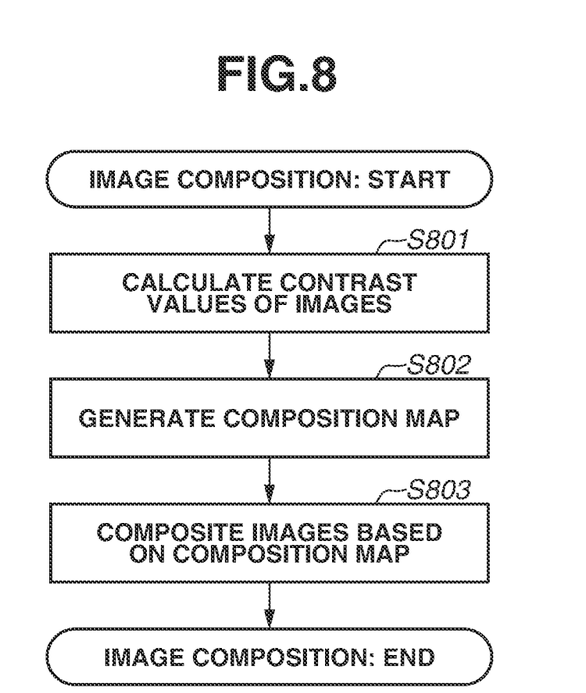
FIG. 8 is a flowchart illustrating image composition in the focus stacking according to the exemplary embodiment.

FIG. 8 is a flowchart illustrating image composition in the focus stacking according to the present exemplary embodiment.

In step S801, the image processing unit 107 calculates a contrast value for each of the aligned images (including the reference image). An example of the contrast value calculation method is that the image processing unit 107 first calculates luminance Y based on color signals Sr, Sg, and Sb of each pixel by using the following equation (2):

$$Y=0.299Sr+0.587Sg+0.114Sb \quad (2)$$

Next, a contrast value I is calculated by applying a Sobel filter to a 3×3 pixel matrix L of the luminance Y as expressed in the following equations (3) to (5):

$$I_h = \begin{pmatrix} -1 & 0 & 1 \\ -2 & 0 & 2 \\ -1 & 0 & 1 \end{pmatrix} \cdot L \quad (3)$$

$$I_v = \begin{pmatrix} -1 & -2 & -1 \\ 0 & 0 & 0 \\ 1 & 2 & 1 \end{pmatrix} \cdot L \quad (4)$$

$$I = \sqrt{I_h^2 + I_v^2} \quad (5)$$

The above-described method for calculating the contrast value is merely an example. For example, an edge detection filter such as a Laplacian filter, or a band-pass filter allowing passage of a predetermined band may be used.

In step S802, the image processing unit 107 generates a composition map. As a method for generating the composition map, the image processing unit 107 compares the contrast values of the pixels at the same position in the respective images, and calculates composition ratios corresponding to the contrast values. More specifically, the image processing unit 107 gives a composition ratio of 100% to the pixel having the largest contrast value among the pixels at the same position, and gives a composition ratio of 0% to the other pixels at the same position. In other words, the following equation (6) is established:

$$A_m(x, y) = \max_{k=1} C_k(x, y) \quad (6)$$

In the equation (6), Ck(x, y) represents the contrast value calculated in step S801, and Am(x, y) represents the ratio of the composition map. Further, m represents an m-th image among the plurality of images different in in-focus position, x represents a horizontal coordinate of the image, and y represents a vertical coordinate of the image.

In step S802, the composition ratios are adjusted as appropriate so that an unnatural boundary is not generated. As a result, the composition ratios of the composite map for one image are not the two values of 0% and 100%, but are continuously changed.

In step S803, the image processing unit 107 performs composition processing on the aligned images by using the composition map generated in step S802, thereby generating a composite image.

According to the present exemplary embodiment, when a scene where the user and the background are away from each other is imaged, an image with less blurs of the user and the background can be easily obtained.

While in the above-described exemplary embodiment, the digital camera 100 for private use has been described, the exemplary embodiment can also be applied to a device such as a portable device or a smartphone as long as the device has a continuous image capturing function and a composition function. In particular, in the case of a device, such as a portable device or a smartphone, including a front camera on a display screen side and a rear camera on a rear surface side, if image capturing by the front camera is set, it may be determined in step S500 that the current mode is the selfie mode, and image capturing processing similar to that described above may be subsequently performed.

An exemplary embodiment of the disclosure can also be implemented by supplying programs for implementing one or more functions according to the above-described exemplary embodiment to a system or an apparatus through a network or a storage medium, and causing one or more processors in a computer of the system or the apparatus to read out and execute the programs. An exemplary embodiment of the disclosure can also be implemented by a circuit (e.g., an ASIC) for implementing the one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-141405, filed Sep. 6, 2022, which is hereby incorporated by reference herein in its entirety.

What is claimed is:
1. An apparatus comprising:
a sensor configured to capture a plurality of images different in in-focus position in an optical axis direction; and
at least one processor configured to function as:
a control unit configured to control the sensor;
a composition unit configured to generate, from the plurality of images, a composite image including an area more focused than each of the plurality of images;

a determination unit configured to determine whether a selfie is being taken; and a detection unit configured to detect a movement of an object in an image, wherein, in a case where the selfie is being taken and magnitude of the detected movement is less than or equal to a predetermined threshold, the control unit controls the sensor to capture the plurality of images, and the composition unit generates the composite image.

2. The apparatus according to claim 1, further comprising a display unit, wherein, in a case where the display unit is positioned in a predetermined direction, the determination unit determines that the selfie is being taken.

3. The apparatus according to claim 1, wherein the detection unit detects the object in the image, wherein, in a case where the detection unit detects a face as the object, the determination unit determines that the selfie is being taken.

4. The apparatus according to claim 3, wherein, in a case where the detection unit detects a plurality of faces, the detection unit detects a face closest to the apparatus among the plurality of faces, as a target object for the selfie.

5. The apparatus according to claim 3, further comprising a storage unit configured to store information, wherein the detection unit determines, based on the stored information, whether the face is a target object for the selfie.

6. An apparatus comprising:

a sensor configured to capture a plurality of images different in in-focus position in an optical axis direction; and at least one processor configured to function as:

a control unit configured to control the sensor;

a composition unit configured to generate, from the plurality of images, a composite image including an area more focused than each of the plurality of images;

a determination unit configured to determine whether a selfie is being taken; and a detection unit configured to detect a movement amount of the apparatus, wherein, in a case where the selfie is being taken and the detected movement amount is less than or equal to a predetermined threshold, the control unit controls the sensor to capture the plurality of images, and the composition unit generates the composite image.

7. An apparatus comprising:

a sensor configured to capture a plurality of images different in in-focus position in an optical axis direction; and at least one processor configured to function as:

a control unit configured to control the sensor;

a composition unit configured to generate, from the plurality of images, a composite image including an area more focused than each of the plurality of images;

a determination unit configured to determine whether a selfie is being taken;

a detection unit configured to detect an object in an image; and a setting unit configured to set an in-focus position in the optical axis direction for image capturing, wherein, in a case where the selfie is being taken and the detection unit detects a background different from the object, the setting unit sets the in-focus position differently for each of the object and the background, the control unit controls the sensor to capture the plurality of images, and the composition unit generates the composite image.

8. The apparatus according to claim 7, wherein the control unit controls the sensor to capture one image of the background.

9. A method for controlling an apparatus, the method comprising:

capturing a plurality of images different in in-focus position in an optical axis direction;

generating, from the plurality of images, a composite image including an area more focused than each of the plurality of images;

determining whether a selfie is being taken; and detecting a movement of an object in an image, wherein, in a case where the selfie is being taken and magnitude of the detected movement is less than or equal to a predetermined threshold, the plurality of images is captured, and the composite image is generated.

10. The method according to claim 9, further comprising:

detecting an object in an image, wherein, in a case where the detecting detects a face as the object, the determining determines that the selfie is being taken.

11. A method for controlling an apparatus, the method comprising:

capturing a plurality of images different in in-focus position in an optical axis direction;

generating, from the plurality of images, a composite image including an area more focused than each of the plurality of images;

determining whether a selfie is being taken; and detecting a movement amount of the apparatus, wherein, in a case where the selfie is being taken and the detected movement amount is less than or equal to a predetermined threshold, the plurality of images is captured, and the composite image is generated.

12. A method for controlling an apparatus, the method comprising:

capturing a plurality of images different in in-focus position in an optical axis direction;

generating, from the plurality of images, a composite image including an area more focused than each of the plurality of images;

determining whether a selfie is being taken; and detecting an object in an image; and setting an in-focus position in the optical axis direction for image processing, wherein, in a case where the selfie is being taken and the detecting detects a background different from the object, the setting sets the in-focus position differently for each of the object and the background, the plurality of images is captured, and the composite image is generated.

13. A non-transitory computer-readable storage medium storing a program for causing a computer to perform a method, the method comprising:

capturing a plurality of images different in in-focus position in an optical axis direction;

generating, from the plurality of images, a composite image including an area more focused than each of the plurality of images;

determining whether a selfie is being taken; and detecting a movement of an object in an image, wherein, in a case where the selfie is being taken and magnitude of the detected movement is less than or equal to a predetermined threshold, the plurality of images is captured, and the composite image is generated.

14. The non-transitory computer-readable storage medium according to claim 13, further comprising:
   detecting the object in the image,
   wherein, in a case where the detecting detects a face as the object, the determining determines that the selfie is being taken.

15. A non-transitory computer-readable storage medium storing a program for causing a computer to perform a method, the method comprising:
   capturing a plurality of images different in in-focus position in an optical axis direction;
   generating, from the plurality of images, a composite image including an area more focused than each of the plurality of images;
   determining whether a selfie is being taken; and
   detecting a movement amount of the apparatus,
   wherein, in a case where the selfie is being taken and the detected movement amount is less than or equal to a predetermined threshold, the plurality of images is captured, and the composite image is generated.

16. A non-transitory computer-readable storage medium storing a program for causing a computer to perform a method, the method comprising:
   capturing a plurality of images different in in-focus position in an optical axis direction;
   generating, from the plurality of images, a composite image including an area more focused than each of the plurality of images;
   determining whether a selfie is being taken;
   detecting an object in an image; and
   setting an in-focus position in the optical axis direction for image processing,
   wherein, in a case where the selfie is being taken and the detecting detects a background different from the object, the setting sets the in-focus position differently for each of the object and the background, the plurality of images is captured, and the composite image is generated.

* * * * *